US011552481B2

(12) United States Patent
Yabu (10) Patent No.: US 11,552,481 B2
(45) Date of Patent: Jan. 10, 2023

(54) INFORMATION PROCESSING TERMINAL, METHOD FOR DISPLAYING TEMPERATURE DISTRIBUTION OF ENERGY STORAGE FACILITY, AND COMPUTER PROGRAM

(71) Applicant: GS Yuasa International Ltd., Kyoto (JP)

(72) Inventor: Toshihiro Yabu, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 17/622,997

(22) PCT Filed: Oct. 18, 2019

(86) PCT No.: PCT/JP2019/041130
§ 371 (c)(1),
(2) Date: Dec. 27, 2021

(87) PCT Pub. No.: WO2020/261592
PCT Pub. Date: Dec. 30, 2020

(65) Prior Publication Data
US 2022/0239123 A1 Jul. 28, 2022

(30) Foreign Application Priority Data
Jun. 28, 2019 (JP) .............. JP2019-121524

(51) Int. Cl.
*H02J 7/00* (2006.01)
*G05B 23/02* (2006.01)

(52) U.S. Cl.
CPC ...... *H02J 7/00041* (2020.01); *G05B 23/0272* (2013.01); *H02J 7/0047* (2013.01); *H02J 7/007194* (2020.01)

(58) Field of Classification Search
USPC ........................................... 320/134
See application file for complete search history.

(56) References Cited

U.S. PATENT DOCUMENTS

| 4,849,682 A | * | 7/1989 | Bauer | H02J 7/0024 320/152 |
| 5,539,297 A | * | 7/1996 | Fiebig | H02J 7/0024 320/152 |

(Continued)

FOREIGN PATENT DOCUMENTS

| JP | 2006-012825 A | 1/2006 |
| JP | 2012-174458 A | 9/2012 |

(Continued)

OTHER PUBLICATIONS

International Searching Authority, International Search Report and Written Opinion for International Application No. PCT/JP2019/041130, dated Nov. 12, 2019, (7 pages), Japan Patent Office, Tokyo, Japan.

*Primary Examiner* — Samuel Berhanu
(74) *Attorney, Agent, or Firm* — Alston & Bird LLP (57) ABSTRACT

An information processing terminal 100, which is used for after-sales service of an energy storage facility 10 that includes an energy storage unit U including a plurality of energy storage modules M, includes: a display unit 107; and a control unit 101, in which the control unit 101 acquires, from the energy storage facility, a temperature of each of the energy storage modules M after start of operation, the temperature being measured by a temperature sensor 37 provided in each of the energy storage modules M, and in which the control unit 101 displays a temperature distribution of the energy storage unit U on the display unit 107 by a color distribution of display colors of a plurality of blocks (Continued)

B depicting an arrangement of the plurality of energy storage modules M in the energy storage unit U.

19 Claims, 10 Drawing Sheets

(56) References Cited

U.S. PATENT DOCUMENTS

| | | | |
|---|---|---|---|
| 11,254,235 B2 * | 2/2022 | Shiiyama | B60L 53/30 |
| 11,408,941 B2 * | 8/2022 | Oshima | G07C 3/00 |
| 2006/0008699 A1 * | 1/2006 | Um | H01M 6/505 |
| | | | 429/62 |
| 2009/0176417 A1 * | 7/2009 | Rembach | B63J 3/02 |
| | | | 440/6 |
| 2012/0119749 A1 | 5/2012 | Iida | |
| 2015/0044532 A1 * | 2/2015 | Hsiao | H01M 10/48 |
| | | | 429/90 |

FOREIGN PATENT DOCUMENTS

| | | |
|---|---|---|
| JP | 2016-146247 A | 8/2016 |
| WO | WO-2011/118112 A1 | 9/2011 |

* cited by examiner

Temperature distribution at xx on day A

Fig. 10

Temperature distribution at xx on day A

INFORMATION PROCESSING TERMINAL, METHOD FOR DISPLAYING TEMPERATURE DISTRIBUTION OF ENERGY STORAGE FACILITY, AND COMPUTER PROGRAM

CROSS REFERENCE TO RELATED APPLICATIONS

This application is a national stage application, filed under 35 U.S.C. § 371, of International Application No. PCT/JP2019/041130, filed Oct. 18, 2019, which claims priority to and the benefit of Japanese Application No. JP 2019-121524, filed Jun. 28, 2019, the contents of both which as are hereby incorporated by reference in their entireties.

BACKGROUND

Technical Field

The present invention relates to an energy storage facility.

Description of Related Art

Energy storage facilities are used as power sources for large moving bodies and energy storage of natural energy. Patent Document WO 2011/118112 A discloses a technique for displaying battery information such as a deterioration rate, a full charge capacity, and an SOC of a battery.

BRIEF SUMMARY

Temperature is one factor that determines the life of the energy storage facility. When an energy storage facility manufacturer considers the configuration of the energy storage facility for proposal to customers, temperature is also an important consideration material in addition to the capacity, voltage, and current range of the energy storage facility. The temperature of the energy storage facility varies depending on the use environment. The use environment is often controlled by a customer. The temperature condition presented to the energy storage facility manufacturer may be a set temperature or an average temperature of an installation place of the energy storage facility. The temperature of the installation place of the energy storage facility is controlled using an air conditioner, a heater, or the like, but a temperature difference may occur depending on the place or on the flow of air. The temperature of the energy storage facility can be depicted in advance, but the actual temperature may not match the depiction result. When many energy storage modules are disposed in the energy storage facility, a temperature difference may occur between the energy storage modules.

If the temperature management is not appropriately performed, the life of the energy storage facility becomes shorter than the expected life. In addition, some of the energy storage modules may be excessively cooled or heated, and energy efficiency of the energy storage facility may be wasted. In one aspect of the present invention, the temperature distribution of the energy storage unit after the start of the operation is displayed in an easily understandable manner, thereby enhancing after-sales service to a customer who owns the energy storage facility, such as proposing improvement in temperature management of the energy storage facility.

Provided is an information processing terminal used for after-sales service of an energy storage facility that includes an energy storage unit including a plurality of energy storage modules, the information processing terminal including: a display unit; and a control unit, in which the control unit acquires, from the energy storage facility, a temperature of each of the energy storage modules after start of operation, the temperature being measured by a temperature sensor provided in each of the energy storage modules, and in which the control unit displays a temperature distribution of the energy storage unit on the display unit by a color distribution of display colors of a plurality of blocks depicting an arrangement of the plurality of energy storage modules in the energy storage unit.

The present technology can be applied to a method for displaying a temperature distribution of an energy storage facility and a computer program.

According to the present technology, by displaying the temperature distribution of the energy storage unit after the start of the operation of the energy storage facility in an easily understandable manner, it is possible to enhance after-sales service to a customer who owns/uses the energy storage facility, such as proposing improvement in temperature management of the energy storage facility.

DETAILED DESCRIPTION OF VARIOUS EMBODIMENTS

The inventor of the present invention has intensively studied and conceived the present technology in order to enhance the customer satisfaction level in view of after-sales service as well as a departure from mere production-selling that only sells products.

Provided is an information processing terminal used for after-sales service of an energy storage facility that includes an energy storage unit including a plurality of energy storage modules, the information processing terminal including: a display unit; and a control unit, in which the control unit acquires, from the energy storage facility, a temperature of each of the energy storage modules after start of operation, the temperature being measured by a temperature sensor provided in each of the energy storage modules, and in which the control unit displays a temperature distribution of the energy storage unit on the display unit by a color distribution of display colors of a plurality of blocks depicting an arrangement of the plurality of energy storage modules in the energy storage unit.

With this configuration, it is possible to display the temperature distribution of the energy storage unit such as which energy storage module has a higher temperature and which energy storage module has a lower temperature among the energy storage units in a visually easily understandable manner. By using the present technology, it is possible to enhance after-sales service to a customer, such as presenting the temperature distribution of the energy storage unit after the start of the operation of the energy storage facility to a customer who owns/uses the energy storage facility to propose improvement in temperature management of the energy storage facility.

The control unit may display temperature distributions of a plurality of dates and times of the energy storage unit on the display unit. In this configuration, the tendency of the temperature distribution according to the date and time can be presented to the customer.

The energy storage module may include a plurality of energy storage devices arranged adjacently. In such an energy storage module, since heat is easily confined, it tends to be difficult to grasp the temperature by depiction in advance. By obtaining the temperature distribution using the measurement value by the temperature sensor, it is possible to obtain a highly reliable and accurate temperature distribution for the energy storage unit in which it is difficult to grasp the temperature by depiction in advance.

The energy storage module may include a plurality of temperature sensors arranged at an interval. By providing the plurality of temperature sensors, it is possible to reduce a risk of displaying an inaccurate temperature distribution due to noise or measurement abnormality.

First Embodiment

1. Description of Energy Storage Facility

Figure 1:
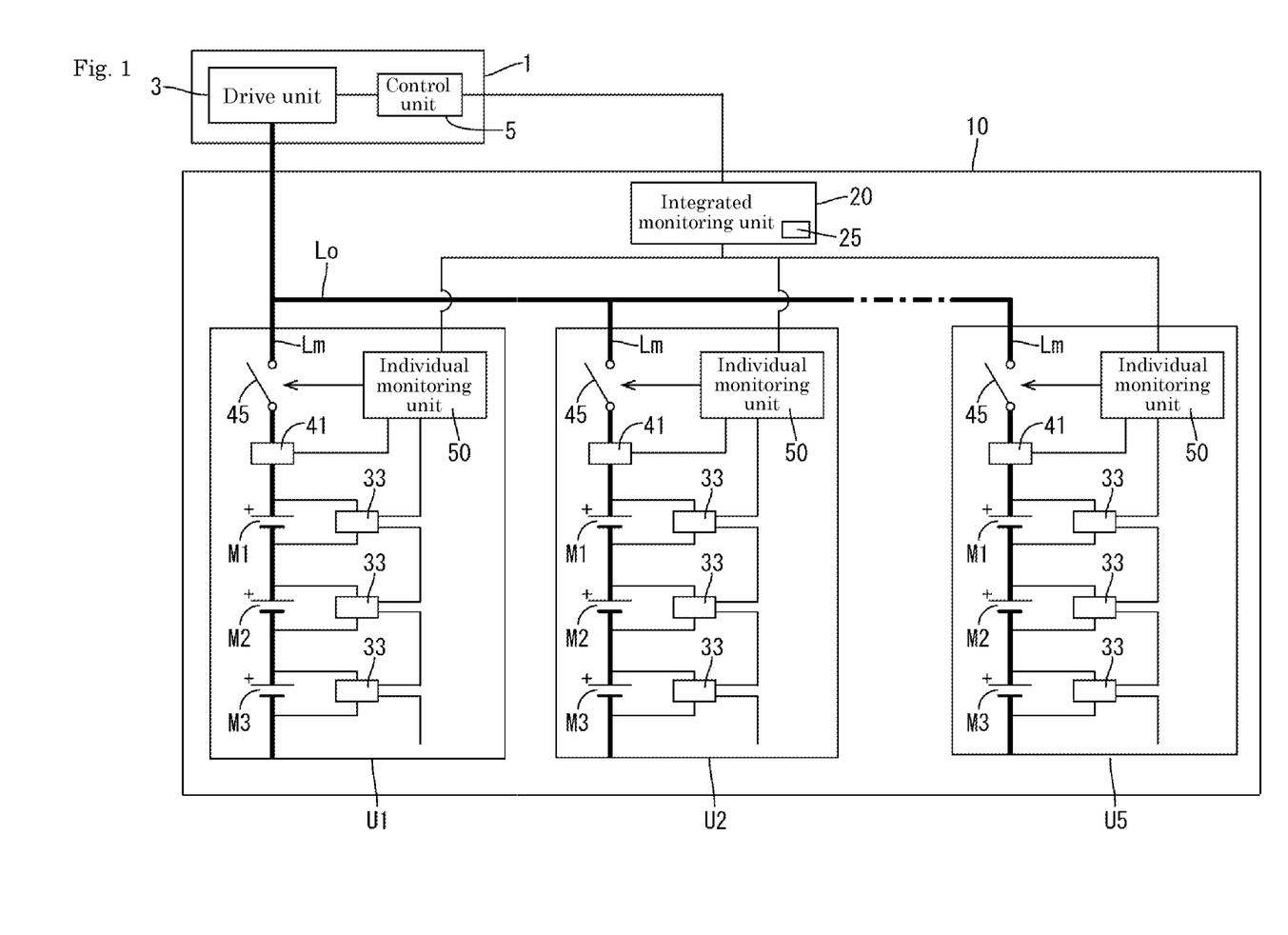
FIG. 1 is a block diagram of an energy storage facility.

FIG. 1 is a block diagram of an energy storage facility 10. The energy storage facility 10 includes an integrated monitoring unit 20 and a plurality of energy storage units U. The plurality of energy storage units U are connected in parallel to a common current path Lo. In this embodiment, the number of the energy storage units U connected in parallel is set to "5". U1 denotes a first energy storage unit, U2 denotes a second energy storage unit, and U5 denotes a fifth energy storage unit.

The plurality of energy storage units U may have the same structure. The energy storage unit U includes a plurality of energy storage modules M connected in series, a plurality of module sensors 33, a current sensor 41, a current interrupt device 45, and an individual monitoring unit 50.

Figure 2:
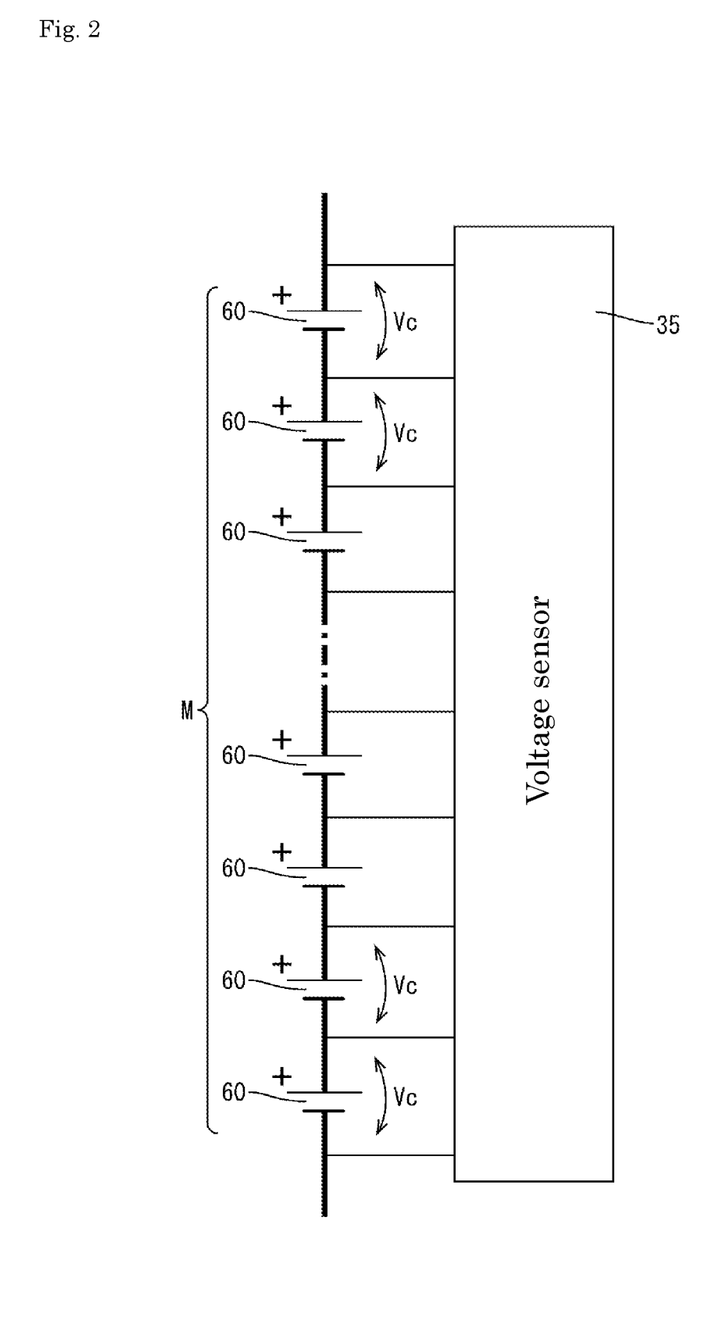
FIG. 2 is a configuration diagram of an energy storage module.

The energy storage module M is an assembly of energy storage devices 60. In this embodiment, as illustrated in FIG. 2, the energy storage module M includes a plurality of energy storage devices 60 connected in series. The energy storage device 60 may be a lithium ion secondary battery cell.

Figure 3:
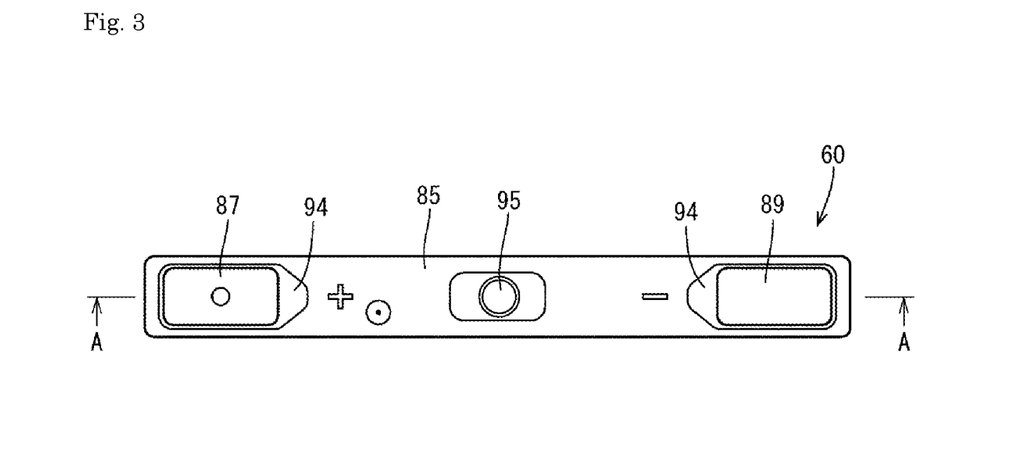
FIG. 3 is a plan view of an energy storage device.
Figure 4:
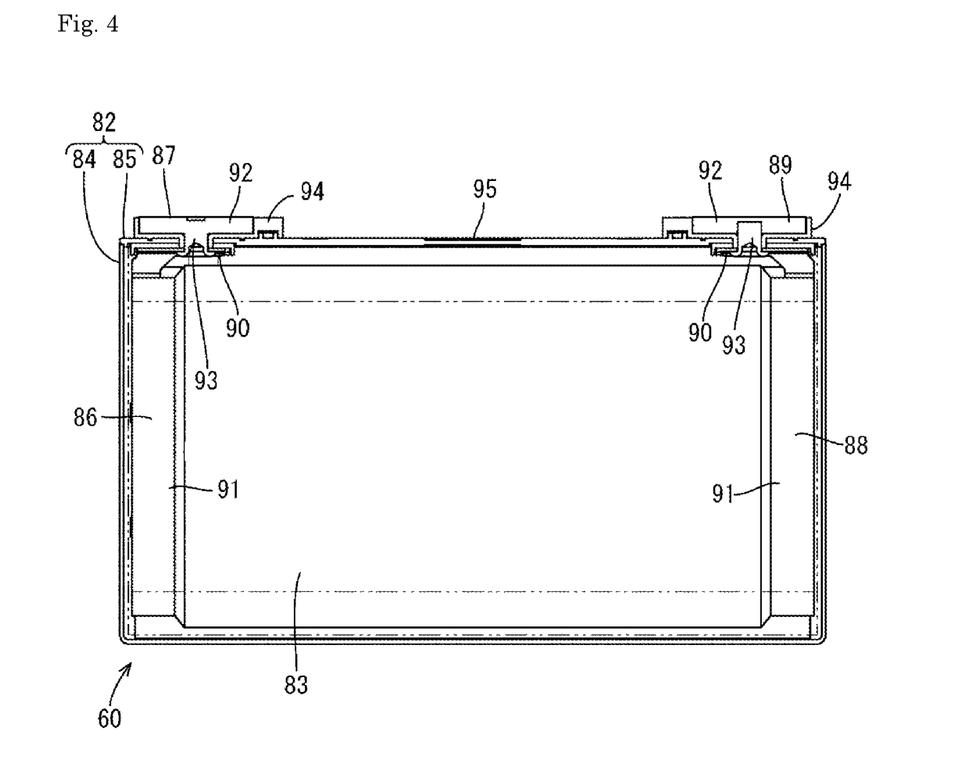
FIG. 4 is a sectional view taken along the line A-A of FIG. 3.

As illustrated in FIGS. 3 and 4, the energy storage device 60 in this embodiment is a prismatic cell in which an electrode assembly 83 is housed in a rectangular parallelepiped case 82 together with a nonaqueous electrolyte. The case 82 includes a case body 84 and a lid 85 that closes an opening portion above the case body 84. Alternatively, the energy storage device may be a pouch cell or a cylindrical cell.

Although not illustrated in detail, the electrode assembly 83 in the present embodiment is formed by disposing a porous resin film (separator) between a negative electrode element formed by applying an active material to a substrate formed of a copper foil and a positive electrode element formed by applying an active material to a substrate formed of an aluminum foil. The negative electrode element, the positive electrode element, and the separator all have a band shape and are wound in a flat shape so as to be housed in the case body 84 in a state where the negative electrode element and the positive electrode element are displaced to opposite sides in the width direction with respect to the separator. Instead of the winding-type electrode assembly, a stacking-type electrode assembly may be used.

A positive electrode terminal 87 is connected to the positive electrode element via a positive electrode current collector 86, and a negative electrode terminal 89 is connected to the negative electrode element via a negative electrode current collector 88. Each of the positive electrode current collector 86 and the negative electrode current collector 88 includes a flat plate-shaped pedestal portion 90 and a leg portion 91 extending from the pedestal portion 90. A through hole is formed in the pedestal portion 90. The leg portion 91 is connected to the positive electrode element or the negative electrode element. Each of the positive electrode terminal 87 and the negative electrode terminal 89 includes a terminal body portion 92 and a shaft portion 93 protruding downward from a center portion of a lower surface of the terminal body portion 92. The terminal body portion 92 and the shaft portion 93 of the positive electrode terminal 87 are integrally formed of aluminum (single material). In the negative electrode terminal 89, the terminal body portion 92 is made of aluminum, and the shaft portion 93 is made of copper, and these are assembled. The terminal body portions 92 of the positive electrode terminal 87 and the negative electrode terminal 89 are disposed at both end portions of the lid 85 via gaskets 94 made of an insulating material, and are exposed outward from the gaskets 94.

The lid 85 includes a pressure release valve 95. As illustrated in FIG. 3, the pressure release valve 95 is located between the positive electrode terminal 87 and the negative electrode terminal 89. When the internal pressure of the case 82 exceeds the limit value, the pressure release valve 95 is released to lower the internal pressure of the case 82.

Figure 5:
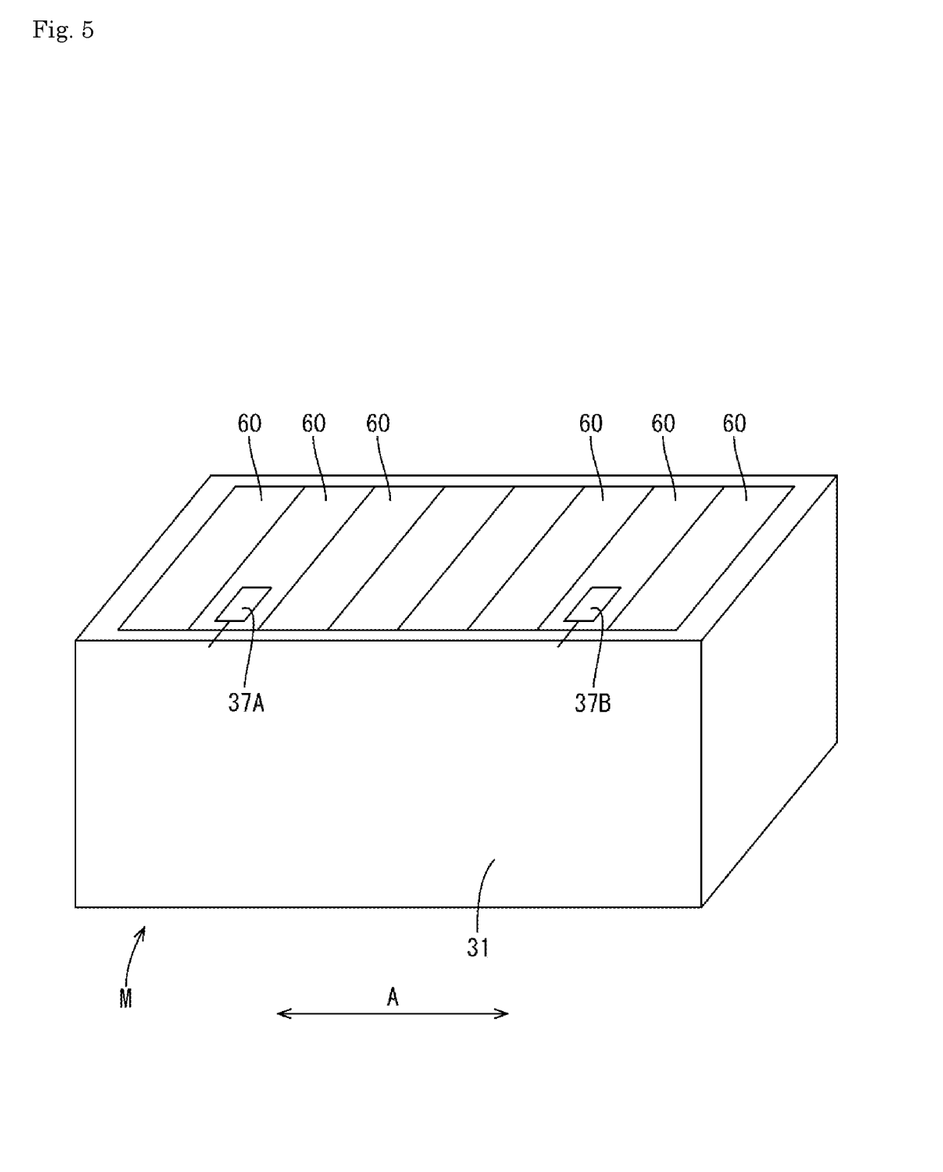
FIG. 5 is a perspective view of the energy storage module.

As illustrated in FIG. 5, the energy storage module M may include a case 31. The plurality of energy storage devices 60 may be housed in the case 31 in an adjacent state.

The module sensor 33 is provided for each energy storage module M. The module sensor 33 includes a voltage sensor 35 and a temperature sensor 37. The voltage sensor 35 detects a voltage Vc of each energy storage device 60 constituting the energy storage module M.

The temperature sensor 37 detects the temperature of the energy storage module M. A plurality of temperature sensors 37 may be provided. In this embodiment, two temperature sensors 37A and 37B are provided. As illustrated in FIG. 5, the two temperature sensors 37A and 37B are disposed apart from each other in a direction A. The direction A is a width direction of the case 31 (an arrangement direction of the energy storage devices 60).

As illustrated in FIG. 1, the module sensor 33 is connected to the individual monitoring unit 50 by a signal line, and data of the voltage Vc of each energy storage device 60 and data of the temperature of the energy storage module M are output to the individual monitoring unit 50.

The current sensor 41 is located in an energization path Lm of the energy storage module M, and detects a current of the energy storage module M. The current sensor 41 is connected to the individual monitoring unit 50 through a signal line, and data of a current I detected by the current sensor 41 is output to the individual monitoring unit 50.

The current interrupt device 45 is controlled to be closed at a normal time (normally closed). The current interrupt device 45 is controlled to be open at an abnormal time and cuts off the current.

The individual monitoring unit 50 includes a CPU (not illustrated) as a central processing unit and a memory (not illustrated) for storing various types of information. The individual monitoring unit 50 monitors the state of the energy storage unit U based on data acquired from the voltage sensor 35, the temperature sensor 37, and the current sensor 41.

<Monitoring Item of Individual Monitoring Unit 50>
(A) Voltage Vc of each energy storage device 60
(B) Voltage Vm of energy storage module M
(C) Temperature T of energy storage module M
(D) Current I of energy storage unit U The individual monitoring unit 50 calculates the temperature T of the energy storage module M based on the measurement values of the two temperature sensors 37A and 37B. For example, an average value of the measurement values of the two temperature sensors 37A and 37B is defined as the temperature T of the energy storage module M.

One temperature sensor 37A may be used for measurement, and the other temperature sensor 37B may be used for correction. For example, the measurement value of the temperature sensor 37A may be corrected by a temperature difference $\Delta T$ between the two temperature sensors 37A and 37B and defined as the temperature of the energy storage module M. Alternatively, when the temperature difference $\Delta T$ between the two temperature sensors 37A and 37B exceeds an allowable value, such a case may be defined as an error (measurement abnormality).

The integrated monitoring unit 20 is connected to the individual monitoring units 50 of the respective energy storage units U1, U2, . . . , and U5 via signal lines, and data of the states of the respective energy storage units U, that is, the data of (A) to (D) described above is taken in from the respective individual monitoring units 50 at predetermined time intervals.

The integrated monitoring unit 20 monitors the state of each energy storage unit U based on the data of (A) to (D) input from the individual monitoring unit 50 of each energy storage unit U. The integrated monitoring unit 20 includes a storage unit 25 that stores the data. The storage unit 25 may be located outside the integrated monitoring unit 20.

The energy storage facility 10 may be for industrial use. In this embodiment, the energy storage facility 10 is used as a power source for a drive unit 3 of an automated guided vehicle 1. The drive unit 3 may be a motor. The integrated monitoring unit 20 may be connected to a control unit 5 of the automated guided vehicle 1 so as to be able to communicate therewith.

2. Temperature Distribution of Energy Storage Facility

Figure 6:
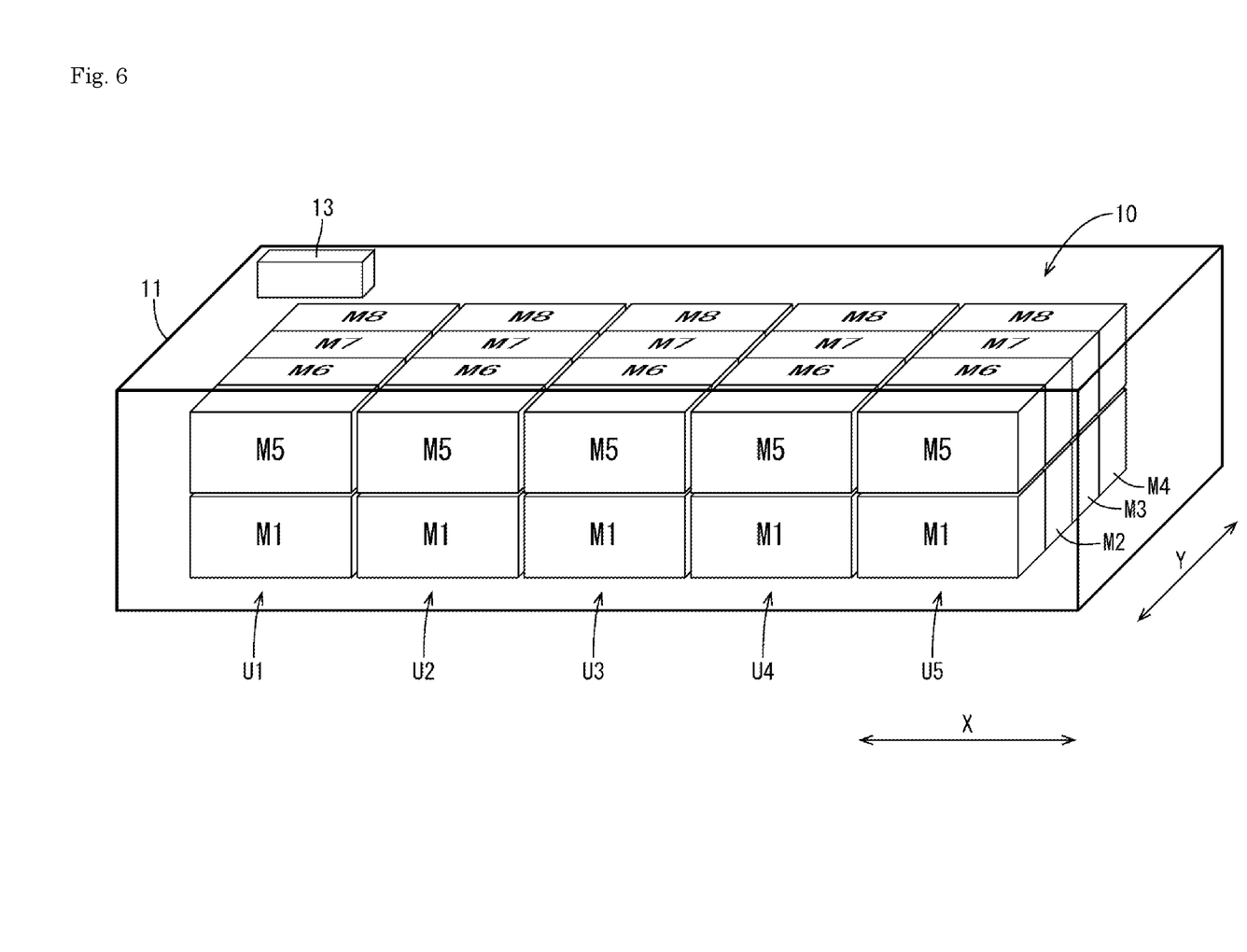
FIG. 6 is a perspective view of the energy storage facility.

FIG. 6 is a perspective view illustrating an installation state of the energy storage facility 10. In this embodiment, the energy storage facility 10 is housed in a housing 11 and mounted on the automated guided vehicle 1.

In this embodiment, the energy storage facility 10 includes five energy storage units U1, U2, U3, U4, and U5. The energy storage units U1 to U5 are arranged in an X direction. The X direction is a long side direction of the housing 11.

The energy storage unit U is an assembly of the energy storage modules M. The energy storage unit U may also be referred to as an energy storage bank. As an example, the energy storage unit U includes eight energy storage modules M1 to M8. The energy storage modules M1 to M8 are arranged in "2×4", that is, two stages in a vertical direction and four arrays in a Y direction. The Y direction is a short side direction of the housing 11.

In this example, the first to fourth energy storage modules M1, M2, M3, and M4 are arranged in the lower stage, and the fifth to eighth energy storage modules M5, M6, M7, and M8 are arranged in the upper stage.

An air conditioner 13 is provided on the ceiling surface of the housing 11. The internal temperature of the housing 11 can be controlled by the air conditioner 13. The air flow inside the housing 11 may not be uniform. Depending on the position of the air conditioner 13, air hits the plurality of energy storage modules M differently. Therefore, there may be a difference in air contact, and a temperature difference may occur between the energy storage modules M. In addition, some of the energy storage modules M may be excessively cooled or heated.

Figure 7:
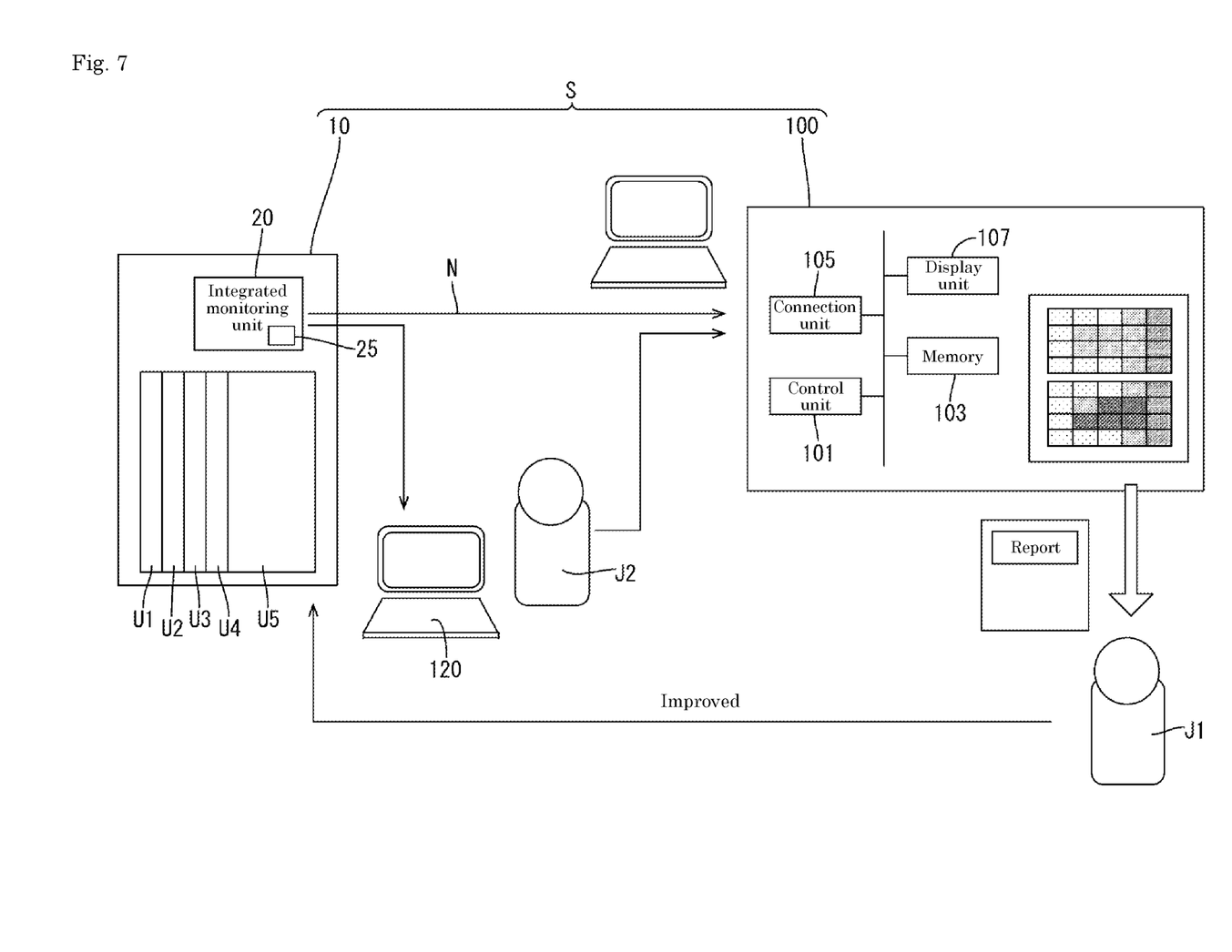
FIG. 7 is a conceptual diagram of a system.

FIG. 7 is a configuration diagram of a system that displays a temperature distribution of the energy storage facility 10 after the start of operation as after-sales service of the energy storage facility 10.

A system S includes the energy storage facility 10 and an information processing terminal 100. The information processing terminal 100 includes a control unit 101, a memory 103, a connection unit 105, and a display unit 107. The memory 103 stores a monitoring program for executing monitoring processing of the energy storage facility 10 and a display program for executing display processing illustrated in FIG. 8.

The information processing terminal 100 may be a portable notebook computer. The information processing terminal 100 may be disposed in a remote monitoring center located remotely from the energy storage facility 10. The information processing terminal 100 may be equipped with a web browser for browsing a web page provided from a remote monitoring server.

The information processing terminal 100 is communicably connected to the integrated monitoring unit 20 of the energy storage facility 10 via the connection unit 105. The integrated monitoring unit 20 periodically outputs the monitoring data of (A) to (D) after the start of operation to the information processing terminal 100 using a communication line N. After the start of operation may mean after the energy storage facility 10 is mounted on the automated guided vehicle 1 and started to be used as a power source.

The information processing terminal 100 remotely monitors the state of the energy storage facility 10 after the start of operation based on the monitoring data acquired from the integrated monitoring unit 20. The information processing terminal 100 monitors whether there is an overcurrent, a voltage abnormality, or a temperature abnormality in the energy storage facility 10.

When receiving the monitoring data of (A) to (D) from the integrated monitoring unit 20, the control unit 105 of the information processing terminal 100 stores the data as a log in the memory 103. The log includes a history of the temperature T of each energy storage module M after the start of operation of the energy storage facility 10. The information processing terminal 100 can execute display processing of displaying the temperature distribution of the energy storage facility 10 using the history of the temperature T of each energy storage module M stored as the log.

Figure 8:
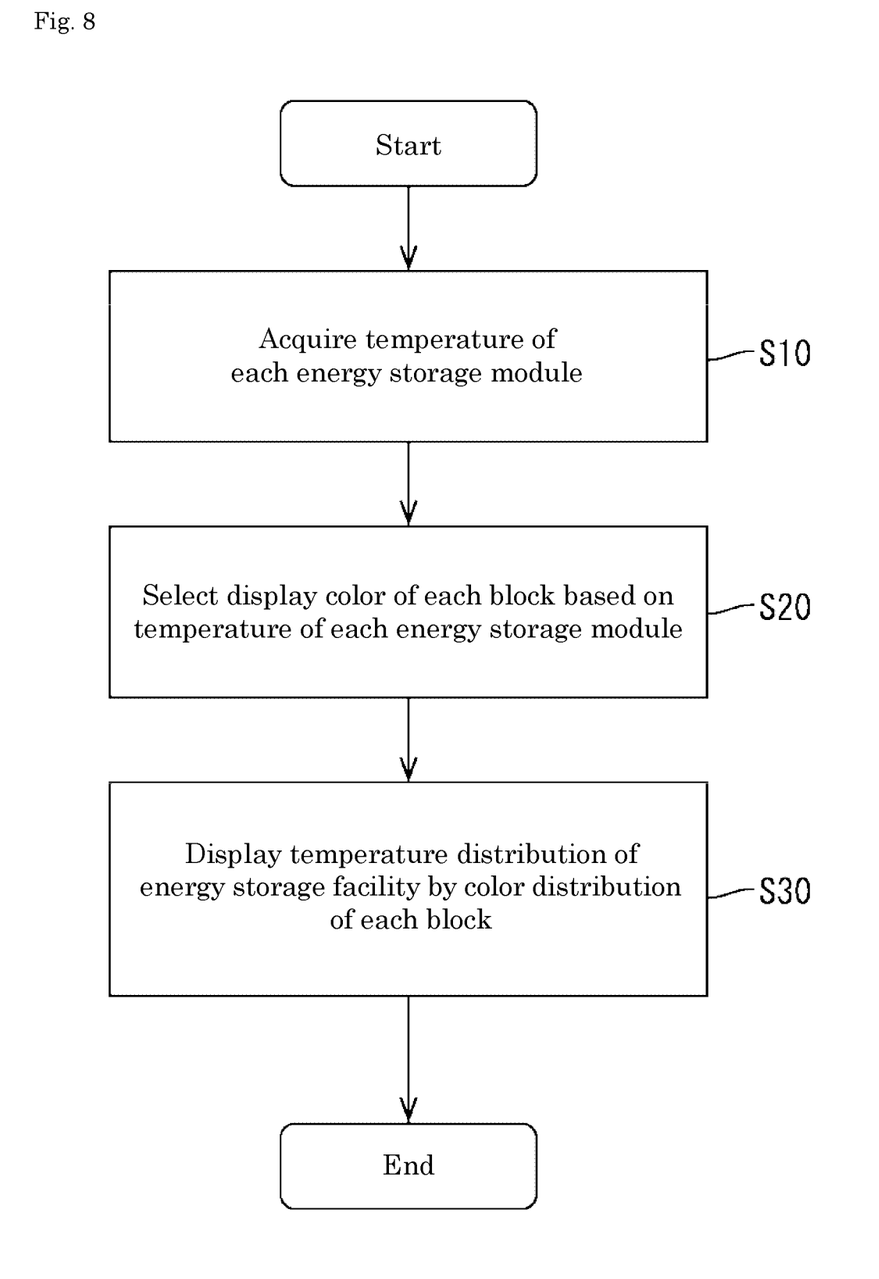
FIG. 8 is a flowchart of monitoring processing.

FIG. 8 is a flowchart of the display processing. The display processing includes three steps of S10 to S30. The display processing can be performed by designating the date and time.

The control unit 101 reads the data of the temperature T of each energy storage module M at the date and time from the memory 103 (S10).

The control unit 101 selects a display color of each block B to be displayed on the display unit 107 based on the read temperature T of each energy storage module M (S20). The number of the blocks B is the same as the number of the energy storage modules M of the energy storage facility 10, and the arrangement of the blocks B is an arrangement depicting the arrangement of the energy storage modules M in the energy storage facility 10.

In this embodiment, as illustrated in FIG. 6, in the energy storage facility 10, five energy storage units U are arranged in the X direction, and in each energy storage unit U, eight energy storage modules M are arranged in "2×4".

The arrangement of the blocks B depicts the arrangement of the energy storage units U and the energy storage modules M in the energy storage facility 10. That is, as illustrated in FIG. 9, eight blocks B arranged in "2×4" by depicting the arrangement of the energy storage modules M in the energy storage unit U are arranged in five rows in the X direction by depicting the arrangement of the energy storage units U.

Figure 9:
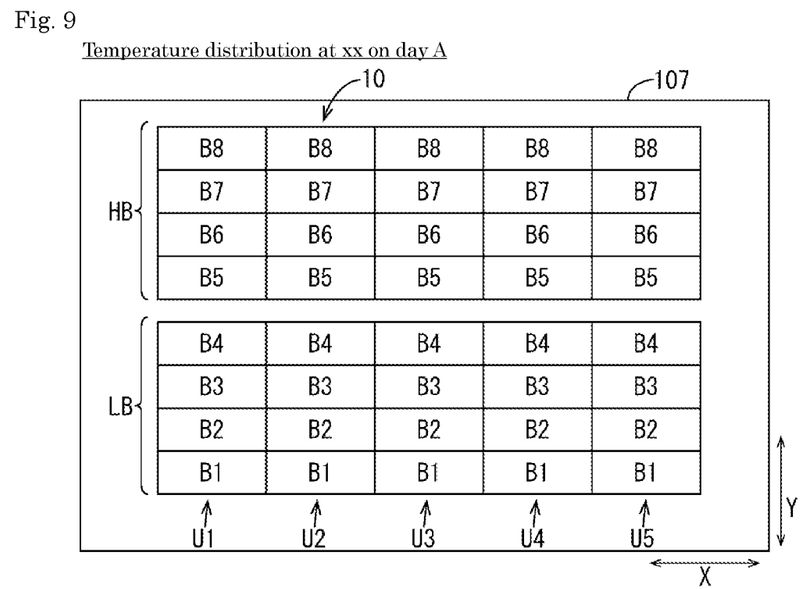
FIG. 9 is a diagram illustrating an array of blocks.

Blocks B1 to B4 in a lower stage LB illustrated in FIG. 9 indicate the energy storage modules M1 to M4 in the lower stage among the respective energy storage units U1 to U8. Blocks B5 to B8 in an upper stage HB indicate the energy storage modules M5 to M8 in the upper stage among the respective energy storage units U1 to U5.

The control unit 101 makes the display color of each block B different according to the temperature of the corresponding energy storage module M. That is, the difference in temperature is displayed using gradation. For example, the saturation (color density) of the display color may be changed according to the temperature, or the hue (color aspect) of the display color may be changed according to the temperature. In addition, both the saturation and the hue may be changed.

The control unit 101 displays the temperature distribution of the energy storage facility 10 at the specific date and time on the display unit 107 by the color distribution of each block B using gradation (S30).

Figure 10:
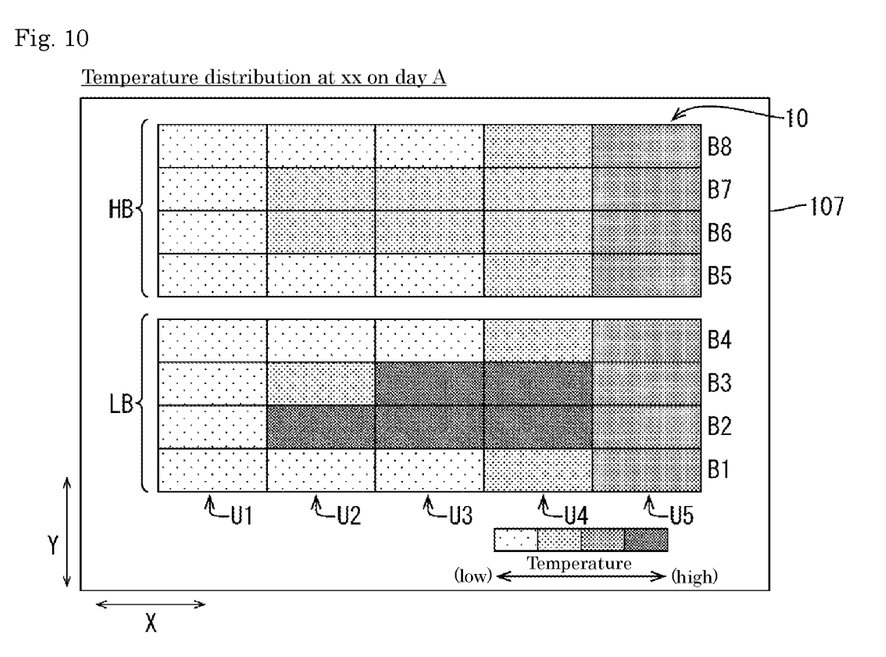
FIG. 10 is a diagram illustrating a temperature distribution.

FIG. 10 is a display example of a temperature distribution of the energy storage facility 10 at xx (time) on day A. Since the block B in the upper stage HB has many parts with lighter display colors than the block B in the lower stage LB, it can be understood that the energy storage modules M5 to M8 in the upper stage have lower temperatures than the energy storage modules M1 to M4 in the lower stage.

Furthermore, the block B located on the left in FIG. 10 has a lighter display color than the block B located on the right. This is because, as illustrated in FIG. 6, the air conditioner 13 is located on the left of the housing 11, and the left energy storage module M close to the air conditioner 13 is cooled more than the right energy storage module M far from the air conditioner 13. The central block B in the lower stage LB is displayed in the darkest color. It can be understood that the energy storage module M located at the center of the lower stage LB is likely to contain heat and has a higher temperature than others.

Figure 11:
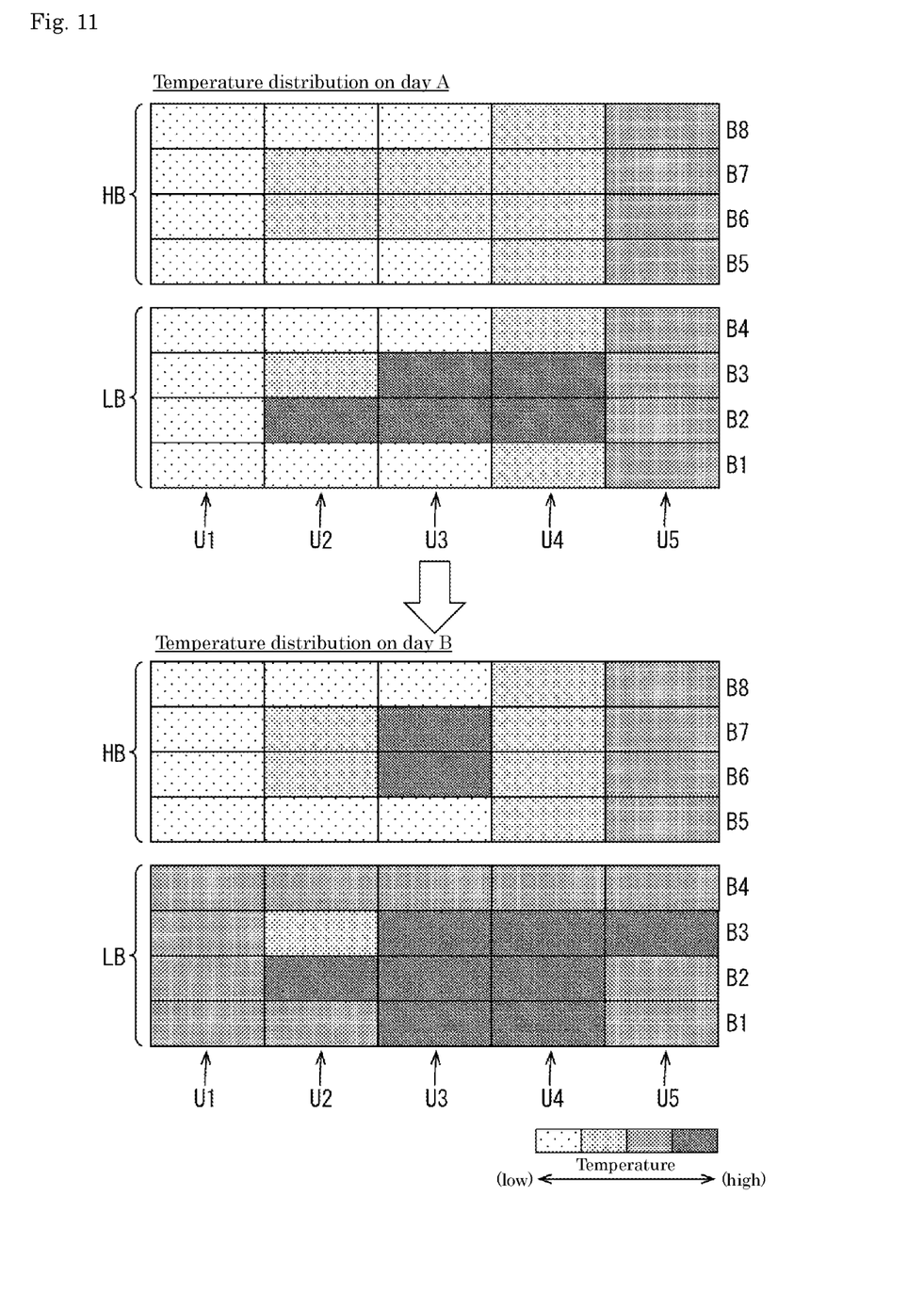
FIG. 11 is a diagram illustrating switching of temperature distributions.

The information processing terminal 100 may calculate the temperature distribution of the energy storage facility 10 for a plurality of dates and times, and display the temperature distributions for the specific dates and times on the display unit 107. For example, as illustrated in FIG. 11, the temperature distribution of the energy storage facility 10 may be calculated for two days of day A and day B, and the results may be switched and displayed on the display unit 107. In this way, the tendency of the temperature distribution according to the date and time can be presented to the customer. The date and time is not limited to day but may be time. That is, temperature distributions at different times on the same day may be switched and displayed.

The information processing terminal 100 can be used for after-sales service of the energy storage facility 10. For example, as illustrated in FIG. 7, when an engineer of an energy storage facility manufacturer explains the current usage environment of the energy storage facility 10 to a customer J1 who owns the energy storage facility 10, the color distribution of the screen illustrated in FIG. 10 is presented, so that the temperature distribution of the energy storage facility 10 can be transmitted to the customer J1 in a visually understandable manner. That is, from the arrangement of the blocks B and the display color thereof, it is possible to transmit which energy storage module M of which energy storage unit U in the energy storage facility 10 tends to have a higher temperature and which energy storage module M of which energy storage unit U tends to have a lower temperature.

By displaying the temperature distribution of the energy storage facility 10 in an easily understandable manner based on the highly reliable actual measurement data, it is possible to encourage the customer J1 to improve the temperature management. By appropriately managing the temperature of the energy storage facility 10, the life requirement for the energy storage facility 10 can be achieved to satisfy the needs of the customer J1. In addition, it is possible to suppress some of the energy storage modules M from being excessively cooled or heated, and to improve the energy efficiency of the energy storage facility 10.

3. Description of Effects

By displaying the temperature distribution of each energy storage module M after the start of the energy storage facility operation in an easily understandable manner, it is possible to enhance after-sales service to a customer who owns/uses the energy storage facility 10, such as proposing improvement in temperature management of the energy storage facility 10.

The energy storage module M of this embodiment includes the plurality of energy storage devices 60 disposed adjacently to each other. In such an energy storage module M, since heat is easily confined, it is particularly difficult to grasp the temperature by depiction in advance. By obtaining the temperature distribution using the measurement value by the temperature sensor 37, it is possible to obtain a highly reliable and accurate temperature distribution for the energy storage facility 10 in which it is difficult to grasp the temperature by depiction in advance.

Other Embodiments

The present invention is not limited to the embodiment described above referring to the drawings, and, for example, the following embodiments are also included in the technical scope of the present invention.

(1) In the first embodiment, the energy storage device 60 is a secondary battery. The energy storage device 60 is not limited to the secondary battery, and may be a capacitor or another chargeable-dischargeable cell (energy storage device).

(2) In the first embodiment, the energy storage facility 10 is used as a power source for a large moving body (automated guided vehicle 1). The energy storage facility 10 is not limited to a power source for a large moving body, and can be used for various applications such as an uninterruptible power system and an energy storage apparatus for a solar power generating system.

Figure 12:
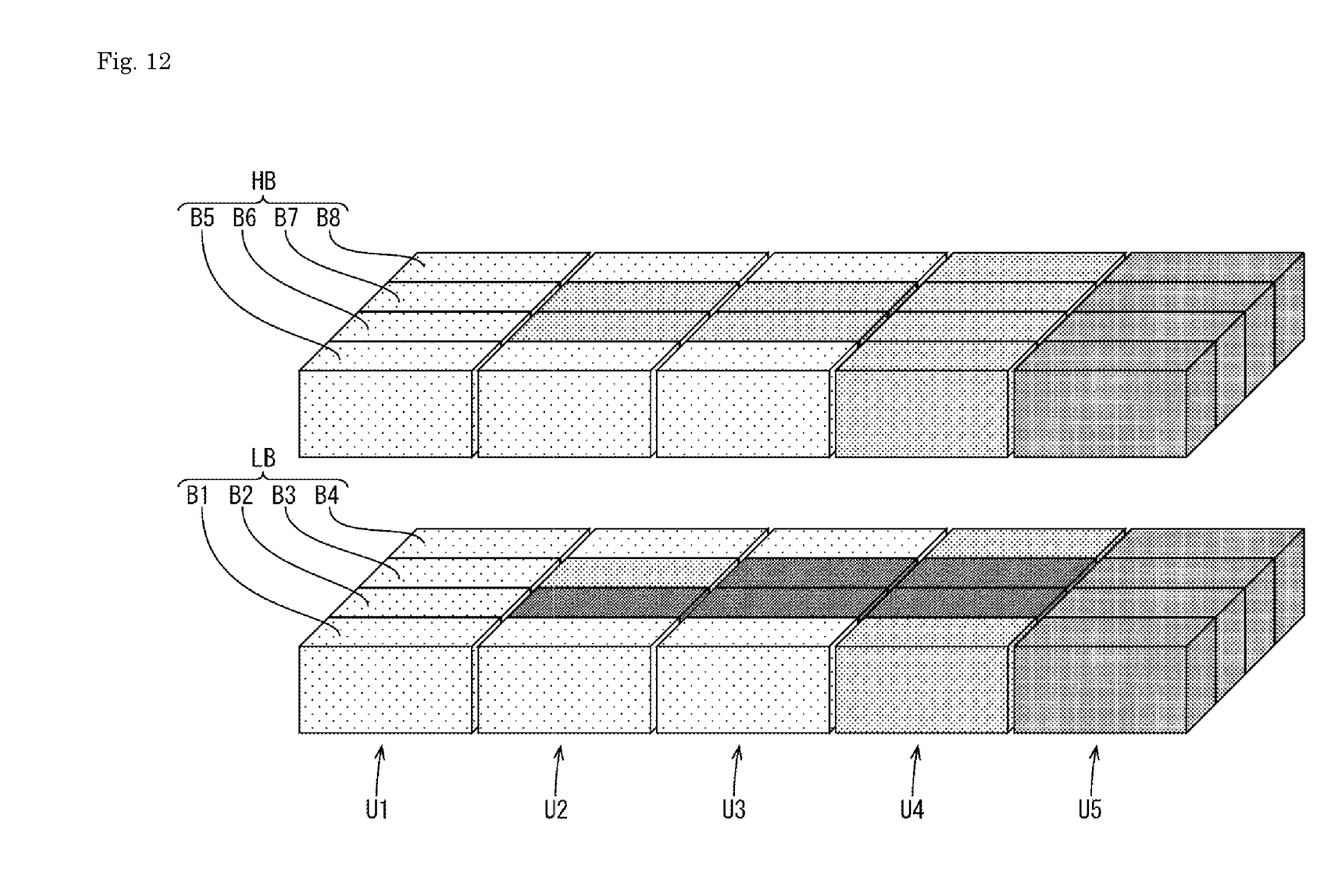
FIG. 12 is a diagram in which blocks have a three-dimensional shape.

(3) In the first embodiment, the blocks B are two-dimensionally displayed, but may be three-dimensionally displayed as illustrated in FIG. 12.

(4) In the first embodiment, the energy storage facility 10 includes the plurality of energy storage units U connected in parallel. The energy storage facility 10 may include a single energy storage unit U.

(5) In the first embodiment, one energy storage unit U includes eight energy storage modules M, which are arranged in "2×4". The number and arrangement of the energy storage modules M used for one energy storage unit U are not limited to the example of the embodiment. The arrangement of the blocks B may depict the arrangement of the energy storage modules M in the energy storage unit U.

(6) In the first embodiment, the temperature distributions on day A and day B are displayed by switching the screens, but the temperature distributions on day A and day B may be simultaneously displayed on the same screen.

(7) In the first embodiment, the information processing terminal 100 acquires the monitoring data of the energy storage facility 10 from the integrated monitoring unit 20 via the communication line N. The acquisition method for monitoring data is not limited to the communication line N. As illustrated in FIG. 7, a worker J2 may go to a site where the energy storage facility 10 is disposed, collect a log of monitoring data from the integrated monitoring unit 20 using a notebook type personal computer 120 or a storage medium, and input the collected log of monitoring data to the information processing terminal 100.

The invention claimed is:

1. An information processing terminal used for after-sales service of an energy storage facility that includes an energy storage unit including a plurality of energy storage modules, the information processing terminal comprising:
   a display unit; and
   a control unit,
   wherein:
      the control unit acquires, from the energy storage facility, a temperature of each of the energy storage modules after start of operation, the temperature being measured by a temperature sensor provided in each of the energy storage modules, and
      the control unit displays a temperature distribution of the energy storage unit on the display unit by a color distribution of display colors of a plurality of blocks depicting an arrangement of the plurality of energy storage modules in the energy storage unit.

2. The information processing terminal according to claim 1, wherein the control unit displays temperature distributions of a plurality of dates and times of the energy storage unit on the display unit.

3. The information processing terminal according to claim 1, wherein the energy storage module includes a plurality of energy storage devices arranged adjacently.

4. The information processing terminal according to claim 1, wherein the energy storage module includes a plurality of the temperature sensors arranged at an interval.

5. The information processing terminal according to claim 2, wherein the energy storage module includes a plurality of energy storage devices arranged adjacently.

6. The information processing terminal according to claim 2, wherein the energy storage module includes a plurality of the temperature sensors arranged at an interval.

7. The information processing terminal according to claim 3, wherein the energy storage module includes a plurality of the temperature sensors arranged at an interval.

8. The information processing terminal according to claim 1, wherein the information processing terminal remotely monitors a state of the energy storage facility after the start of operation based on monitoring data, wherein the monitoring data includes the temperature, acquired from the energy storage facility via a communication line.

9. The information processing terminal according to claim 1, wherein the control unit acquires the temperature using a storage medium for collecting a log of monitoring data.

10. The information processing terminal according to claim 1, wherein the control unit causes the display unit to display the temperature distributions of the energy storage unit at different dates and times by switching screens.

11. The information processing terminal according to claim 1, wherein the control unit causes the display unit to display the blocks three-dimensionally.

12. The information processing terminal according to claim 1, wherein the control unit acquires the temperature obtained based on measurement values of the temperature sensors provided in each of the energy storage modules.

13. A method for displaying a temperature distribution of an energy storage facility that includes an energy storage unit including a plurality of energy storage modules, the method comprising:
   acquiring, from the energy storage facility, a temperature of each of the energy storage modules after start of operation, the temperature being measured by a temperature sensor provided in each of the energy storage modules; and
   displaying a temperature distribution of the energy storage unit by a color distribution of display colors of a plurality of blocks depicting an arrangement of the plurality of energy storage modules in the energy storage unit.

14. The method according to claim 13, wherein, in the acquiring step, the temperature is acquired via a communication line and input to an information processing terminal.

15. The method according to claim 13, wherein, in the acquiring step, the temperature is acquired using a storage medium for collecting a log of monitoring data and input to an information processing terminal.

16. The method according to claim 13, wherein, in the displaying step, the temperature distributions of the energy storage unit at different dates and times are displayed by switching screens.

17. The method according to claim 13, wherein, in the displaying step, the blocks are displayed three-dimensionally.

18. The method according to claim 13, wherein, in the acquiring step, the temperature obtained based on measurement values of the temperature sensors provided in each of the energy storage modules is acquired.

19. A non-transitory computer-readable storage medium comprising instructions that when executed by a computer cause the computer including a display unit and a control unit to display a temperature distribution of an energy storage facility that includes an energy storage unit including a plurality of energy storage modules, the instructions, when executed, further causing the computer to:
   acquire a temperature of each of the energy storage modules after start of operation, the temperature being measured by a temperature sensor provided in each of the energy storage modules; and display a temperature distribution of the energy storage unit by a color distribution of display colors of a plurality of blocks depicting an arrangement of the plurality of energy storage modules in the energy storage unit.

\* \* \* \* \*